United States Patent [19]

Marry

[11] Patent Number: 4,680,787
[45] Date of Patent: Jul. 14, 1987

[54] PORTABLE RADIOTELEPHONE VEHICULAR CONVERTER AND REMOTE HANDSET

[75] Inventor: Patrick J. Marry, Cary, Ill.

[73] Assignee: Motorola, Inc., Schaumburg, Ill.

[21] Appl. No.: 907,125

[22] Filed: Sep. 12, 1986

Related U.S. Application Data

[63] Continuation of Ser. No. 673,650, Nov. 21, 1984, abandoned.

[51] Int. Cl.[4] .............................................. H04Q 7/04
[52] U.S. Cl. ........................................ 379/63; 379/58; 455/349; 340/365 R; 340/365 VL
[58] Field of Search ................ 179/2 E, 2 EA, 2 EB, 179/2 EC; 340/365 R, 365 S, 365 VL; 455/33, 54, 89, 349

[56] References Cited

U.S. PATENT DOCUMENTS

| | | | |
|---|---|---|---|
| 3,906,166 | 9/1975 | Cooper et al. | 179/41 A |
| 3,919,491 | 11/1975 | Luce | 179/2 EA |
| 3,962,553 | 6/1976 | Linder et al. | 179/41 A |
| 4,087,638 | 2/1978 | Hayes et al. | 179/2 E |
| 4,144,497 | 3/1979 | Andrea, III | 325/302 |
| 4,369,516 | 1/1983 | Byrns | 375/110 |
| 4,390,963 | 6/1983 | Puhl et al. | 364/900 |
| 4,398,265 | 8/1983 | Puhl et al. | 364/900 |
| 4,434,461 | 2/1984 | Puhl | 364/200 |
| 4,458,111 | 7/1984 | Sugihara | 179/2 BC |
| 4,481,587 | 11/1984 | Daniels, Jr. | 364/466 |

OTHER PUBLICATIONS

Millicom, Cellular Portable Telephone, Undated Product Brochure §1.2 and §6.4.
"MOD Keyboard", Nelson et al., Micro-I.E.E.E., 8/86, pp. 7-17.

Primary Examiner—Robert Lev
Attorney, Agent, or Firm—Raymond A. Jenski; Rolland R. Hackbart

[57] ABSTRACT

A portable radiotelephone is disclosed in which an associated logic unit communicates via a data bus with an internal keypad and display and a detachable external keypad and display. Capability is provided for detecting the presence of the external keypad on the data bus and, in response to the detection, the information which would normally be communicated between the logic unit and the internal keypad and display is diverted to the external keypad and display. When the external keypad is detached from the data bus, communications between the logic unit and the internal keypad and display is reestablished.

38 Claims, 12 Drawing Figures

PRIOR ART

PRIOR ART

Fig. 3

PRIOR ART

PORTABLE RADIOTELEPHONE VEHICULAR CONVERTER AND REMOTE HANDSET

This is a continuation of application Ser. No. 673,650 filed 11.24.84 now abandoned.

RELATED U.S. PATENTS AND PATENT APPLICATIONS

The present application is related to the following U.S. Patents which are assigned to the assignee of the present application: U.S. Pat. No. 4,369,516 "Self-Clocking Data Transmission System" by John P. Byrns; U.S. Pat. No. 4,390,963 "Interface Adapter Structure" by Larry C. Puhl, et al; U.S. Pat. No. 4,398,265 "Keyboard and Display Interface Adapter Architecture" by Larry C. Puhl, et al; and U.S. Pat. No. 4,434,461 "Microprocessor with Duplicate Registers for Processing Interrupts" by Larry C. Puhl. The present application is also related to the following U.S. patent applications which are assigned to the assignee of the present application: Ser. No. 187,304, "Microprocessor Controlled Radiotelephone Transceiver", filed on behalf of Larry C. Puhl, et al on Sept. 15, 1980; and Ser. No. 493,919 "Microcomputer Controlled Data Receiver", filed on behalf of James L. Wilson, et al on May 12, 1983. By reference thereto, the foregoing related patents and patent applications are incorporated in their entirety into the present application.

BACKGROUND OF THE INVENTION

This invention relates to portable radiotelephone equipment and more specifically relates to an interface system which enables the automatic incorporation of a remote handset into the operation of the portable radio telephone.

Portable radio transceivers have enabled users to take the capability of radio communication wherever they may go. By the very nature of being portable, the transceivers must be light weight and non-bulky. This nature is generally in opposition to a large storage battery for long duration high powered transmissions and an efficient antenna with unperturbed radiation characteristics. To resolve these problems and to improve transmission and reception performance which usually suffers serious degradation if the portable transceiver is used inside a metal vehicle, transceiver developers have adapted the portable transceiver to be used in a vehicle. The portable transceiver may share the vehicle's battery and utilize the vehicle to support an optimum antenna, thereby increasing both the available duration of transmission and the radio range of the portable transceiver.

Similarly, a portable radiotelephone can benefit from a vehicle's battery and antenna. A radiotelephone, however, has significantly more user interface functions (such as a telephone push button keypad for dialling) than a typical transceiver. When the portable radiotelephone is placed into a converter which mechanically supports the portable and antenna in a vehicle, it is desirable to connect an external telephone handset to the portable radiotelephone. This connection enables user interface elements to be placed advantageously near the user while allowing the portable radiotelephone to be placed out of sight.

Remote handsets have been used with radiotelephones previously. Earlier versions of mobile radiotelephones had the capability of more than one handset; each handset would operate in parallel with the others. Parallel operation, however, did not allow independence of operation. If the external telephone handset and keypad of a portable radiotelephone could be caused to operate independently of the integral handset and keypad, additional capability could be added to the radiotelephone.

Therefore, a portable radiotelephone system which enables a portable radiotelephone to be detachably mounted in a vehicle to share that vehicle's battery and antenna and which additionally enables the portable radiotelephone to utilize a remote handset and keypad which are automatically connected when the portable radiotelephone is placed in the converter would be highly desirable. Furthermore, if the presence or absence of the remote handset could be automatically detected by the portable radiotelephone, additional functions could be made available.

SUMMARY OF THE INVENTION

Thus, one object of the present invention is to enable a portable radiotelephone to be inserted into a vehicle-mounted converter, allowing use of the vehicle's battery and external antenna.

Another object of the present invention is to provide an external handset and keypad with the vehicle converter.

Another object of the present invention is to automatically detect when the portable radiotelephone has been inserted into the converter and to disable the integral keypad while enabling the external keypad.

These and other objects are achieved in the present invention which includes the means and method which enables a portable radiotelephone logic unit to communicate with an internal data device and a detachable external data device via a data bus. Capability is provided for detecting the presence of the external data device on the data bus. In response to the detection of the external data device, the information which would normally be communicated between the logic unit and the internal data device is diverted to the external data device. Upon the detection of a subsequent removal of the external data device from the data bus, the normal information communication between the logic unit and the internal data device is restored.

DETAILED DESCRIPTION OF THE PREFERRED EMBODIMENT

Radiotelephones provide the same type of fully automatic telephone service to a mobile or portable user that is provided to a conventional land line subscriber. In a cellular radiotelephone system, service is provided over a wide geographic area by dividing the area into a number of cells. Each cell typically has a base station which provides a signalling radio channel and a number of voice radio channels. Telephone calls are placed to, and originated by, radiotelephones over the signalling channel in each of the cells. Upon completion of the signalling, the radiotelephone is assigned a voice channel to which it switches from the signalling channel for the duration of the call. In the event that a radiotelephone leaves the cell and enters another cell, the radiotelephone is automatically switched over, or handed off, to an available voice channel in the new cell.

The present invention has been designed to operate in the portable radiotelephone units of a cellular system, although it could be used in any automatic radiotelephone system. The portable unit may be one such as that marketed by Motorola, Inc. as sales model FO9DTD8824AN or of the type described in U.S. Pat. Nos. 3,906,166 "Radio Telephone System" by Cooper et al. and U.S. Pat. No. 3,962,553 "Portable Telephone System having a Battery Saver Feature" by Linder et al., and may have an external appearance as illustrated in U.S. Pat. Nos. D234,605 or D269,873.

Figure 1:
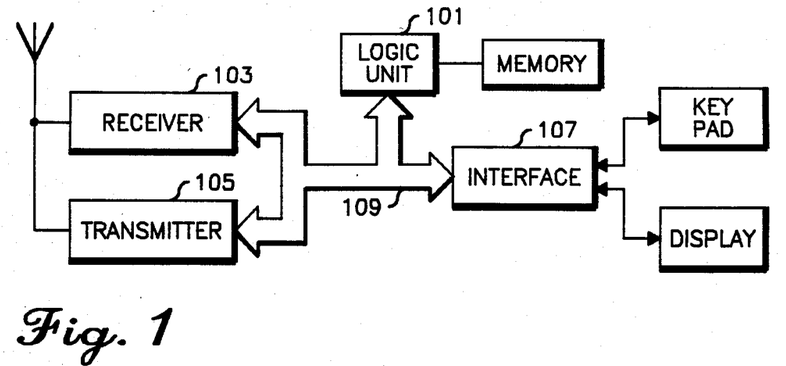
FIG. 1 is a block diagram of a portable radiotelephone which may employ the present invention.

In order to accommodate the signalling and control functions in an automatic radiotelephone system, a microprocessor, memory, and related peripheral devices are employed in a logic unit for control of the portable radiotelephone. This logic unit may be architectured such that the signalling received from the base station or transmitted to the base station is handled on a high speed interrupt basis while control signals for the radio unit, including keypad and display, are handled on a lower speed basis by way of a separate serial data bus. Such a microprocessor control system is further described in U.S. Pat. No. 4,434,461 "Microprocessor with Duplicate Registers for Processing Interrupts" by Puhl. Alternately, all data communication between the logic unit, the portable transceiver and the integral keypad and display may be handled on a high speed serial data bus as shown in FIG. 1. A TRN5808A Logic Unit, available from Motorola, Inc., is configured to operate with such a serial data bus. In FIG. 1, the logic unit 101 is connected to the receiver 103 and the transmitter 105 and in interface 107 via a self-clocking serial data bus 109. Since the serial data bus 109 is self-clocking and independent of the speed of transmission, the interface adaptor 107 could be remotely located from the logic unit 101.

Figure 2:
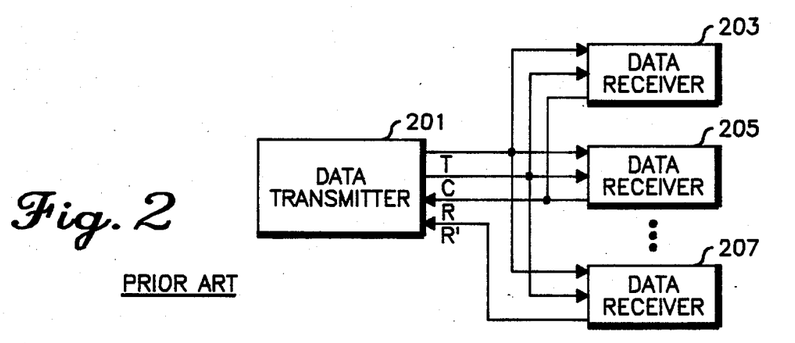
FIG. 2 is a block diagram of a known generalized data communications system which may be useful in employing the present invention.

The serial data bus may be briefly described in conjunction with FIG. 2. A more detailed description of this data bus is found in U.S. Pat. No. 4,369,516, "Self-Clocking Data Transmission System" by Byrns. A general data transmitter 201 is coupled to data receivers 203, 205 and 207 by two signal lines, labeled T (true data) and C (complement data). The data receivers 203 and 205 may also transmit return data signals to the data transmitter by means of a shared signal line labeled R (return data). A separate return data line (R') may also be used to transmit return data signals to the data transmitter as shown for data receiver 207. The return data signals transmitted by the data receivers 203, 205, and 207 on the return data signal lines are transmitted in synchronism with the data signals received from the data transmitter 201 on the true data and complement data signal lines.

If the general bidirectional bus concept of FIG. 2 is applied to the control circuitry of a portable radiotelephone, the data transmitter becomes the logic unit and the data receivers become the transmitter, receiver, user interface, and other devices sharing the bus.

Figure 3:
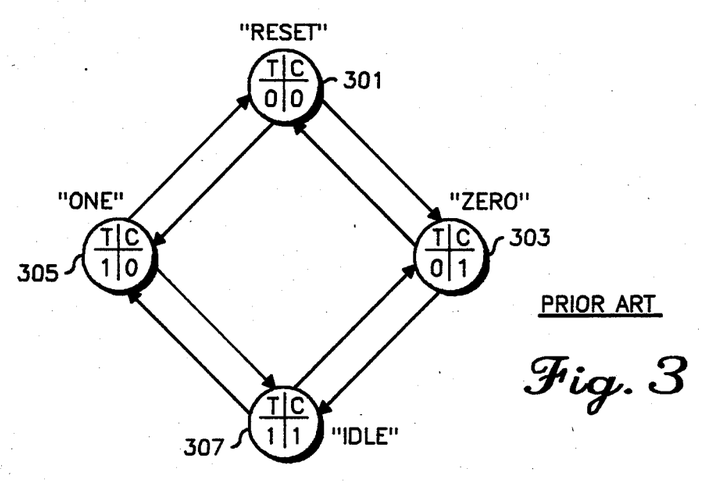
FIG. 3 is a state diagram for a known method of communicating data on the system of FIG. 2.

The format taken by the data transmitted by the data transmitter 201 to the data receivers 203, 205, and 207 makes use of the four two-bit binary states which can be assumed by the true data and complement data signal lines taken together. For example, referring to the state diagram of FIG. 3, a first two-bit binary state may be referred to as a "reset" state 301, where the true data signal line has a binary zero value and the complement data signal line also has a binary zero value. When no data is being transmitted, the reset state 301 is provided on the true data and complement data signal lines. When a data signal is to be transmitted, a transition is made from the reset state 301 to either a "zero" state 303 or a "one" state 305 corresponding to a zero or a one in the input data to be transmitted. In the zero state 303, the true data line assumes a zero binary value and the complement data line assumes a one binary value. In the one state 305, the true data line assumes a one binary value and the compliment data line assumes a binary zero value. Following the one state 305 or the zero state 303, the serial data bus assumes an "idle" state 307 in which both the true data line and the complement data line assume a one binary value. A transition is then made from the idle state 307 to either the one state 305 or the zero state 303. For all succeeding bits of the data signal to be transmitted, a transition is made to the idle state 307 before a transition to the one state 305 or the zero state 303. This can be seen in FIG. 4.

Figure 4:
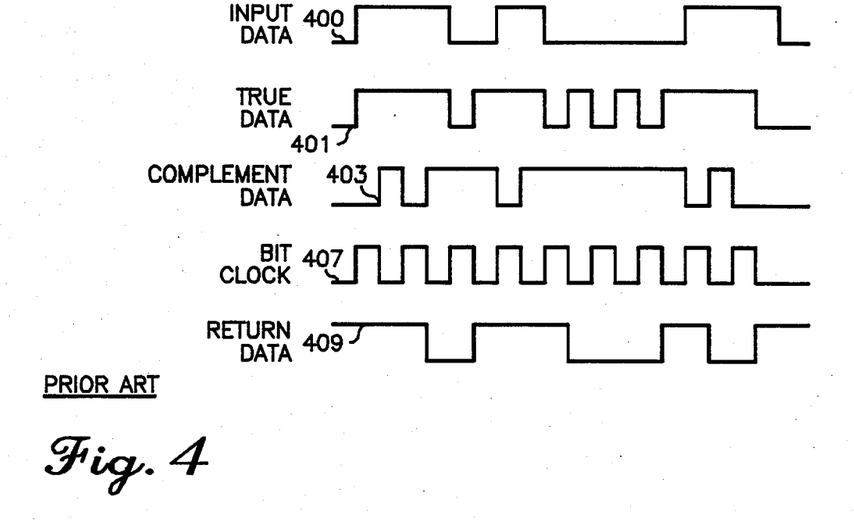
FIG. 4 is a timing diagram showing the relationship between the input data and the data transmitted over the system of FIG. 2.

Transitions between the states in FIG. 4 are selected such that only one signal line is changing binary value during each transition. Transitions between the reset state 301 and the idle state 307 and between the one state 305 and the zero state 303 are not allowed since they would require that the value of both the true and the complement data signal lines change simultaneously. This limiting of transitions between the binary states mimimizes the effects of skewing and timing variations. Moreover, by transmitting data signals as illustrated in the state diagram of FIG. 3, the transmission on the true data and complement data signal lines is both self-clocking and independent of the transmitting frequency. The time duration between each of the state transitions need not be the same and may vary dynamically thereby enabling the frequency of the data transmission to be entirely asynchronous with randomly varying time intervals between successive state transitions.

Understanding of the data format may be enhanced by referring to FIG. 4. For transmission of a data signal, two state transitions occur for each input data bit shown in input data stream 400. For the first bit of the transmitted data signal, a transition is made from the reset state 301 to the one state 305 resulting in the true data signal line attaining a binary one as shown at 401. Next, a state transition is made to the idle state 307 resulting in the complement data signal line attaining a binary one value at 403. Then, for each succeeding bit of the data signal, a transition is made the one state 305 or the zero state 303 and then back to the idle state 307. Since a transition is made to the idle state 307 for each bit of the data input signal to be transmitted, the received idle state 307 can be utilized at the data receivers to generate a bit clock signal 407. For the last bit of the data signal, the last state transition is made from the one state 305 or the zero state 303 to the reset state 301. Returning to the reset state 301 after the last bit of the data signal has been transmitted indicates to the data receivers 203, 205, and 207, that a complete data signal has been transmitted.

Figure 5:
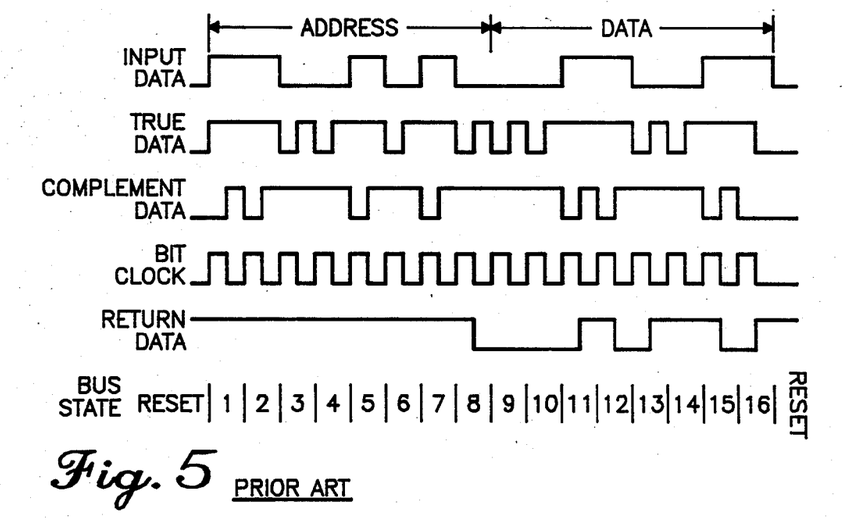
FIG. 5 is a timing diagram showing information and addressing data which may be transmitted over the system of FIG. 2 and may be used to select a particular data receiver for the information.

In order to provide for the bidirectional transmission of data signals between the data transmitter 201 and the data receivers 203, 205 and 207, another signal line referred to as the return data signal line 409 is provided for carrying data signals from the data receivers 203, 205, and 207. The data receivers can transmit a return data signal on the return data signal line by utilizing the bit clock signal 407 developed by detecting the bit value of the true data and complement data signal lines. As previously described, separate return data signals lines can be provided to each data receiver as for data receiver 207, or a number of data receivers such as data receivers 203 and 205 can be connected to one return data signal line. If a number of data receivers are connected to the same return data signal line, it becomes necessary to selectively address the particular data receiver that is to transmit a return data signal. Many different addressing schemes may be utilized and one such addressing scheme, which utilizes a portion of the data signal transmitted by the data transmitter to provide an address, is shown in FIG. 5. The number of bits dedicated to the address function determines the maximum number of data receivers which can be uniquely addressed. It has been shown in U.S. Pat. No. 4,390,963 "Interface Adaptor Architecture" by Puhl, et al, that the true data and complement data signal lines may be dynamically interchanged and an additional number of unique addresses may be obtained.

This serial data bus is used to particular advantage in a portable radiotelephone employing the present invention. In order to provide the portable radiotelephone with all the features and radio transmission advantages of a mobile radiotelephone, the portable radiotelephone is inserted into a vehicle mounted converter device which provides power, improved antenna location, and additional microcomputer capacity for extended functions. Power and antenna converters for portable radio transceivers are commonly available; one such converter is offered by Motorola, Inc. as sales model number F09DTD8830AA.

Figure 6:
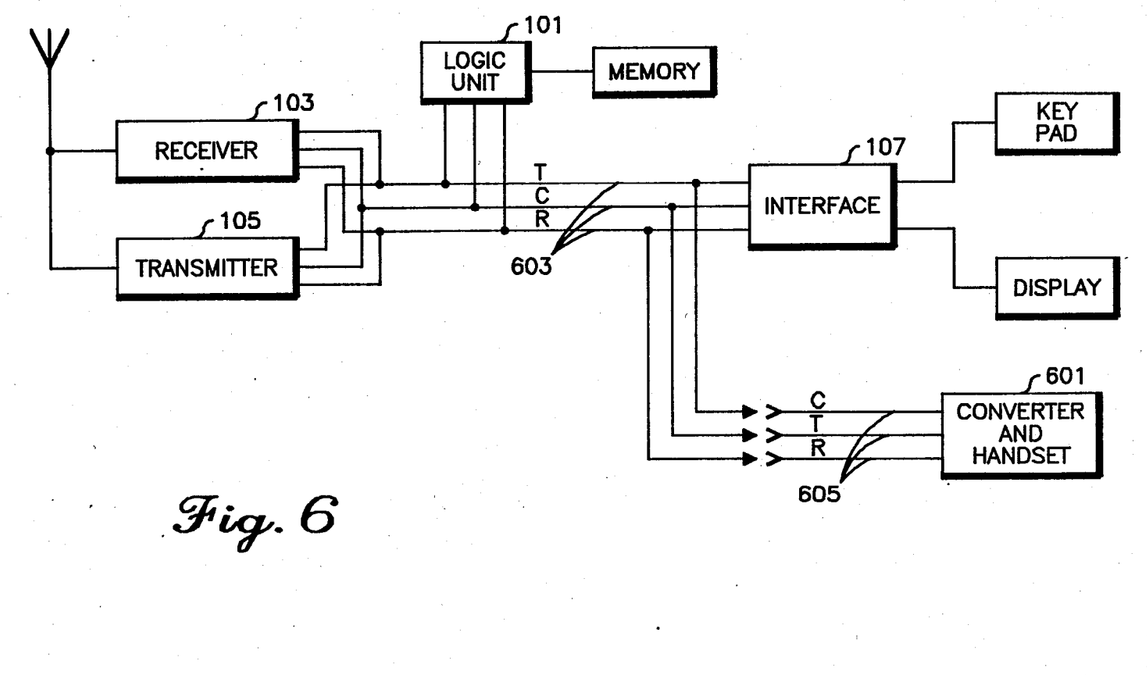
FIG. 6 is a block diagram of a portable radiotelephone and remote converter and handset employing the present invention.

The incorporation of the vehicular converter and an associated remote handset into the high speed serial data bus configuration of a portable radiotelephone is depicted in block diagram form in FIG. 6. The converter and handset 601 is connected to the serial data bus 603 in such a way that the true data and complement data signal lines are reversed as shown on bus 605. This reversal, rather than being employed to increase the number of data receivers on the serial data bus as mentioned above, simplifies the addressing of the converter and handset 601 by the logic unit 101 and results in a significant reduction in the amount of memory that otherwise would be dedicated to unique address generation. The address of the converter and handset 601 is the logical complement of the address of interface 107 thereby merely neccessating a simple inversion of address by the logic unit 101 to distinguish the addresses of converter and handset 601 from interface 107. Therefore, when the presence of the converter and handset 601 is detected by the logic unit 101, all data is inverted before being transmitted over the serial data bus.

Figure 7:
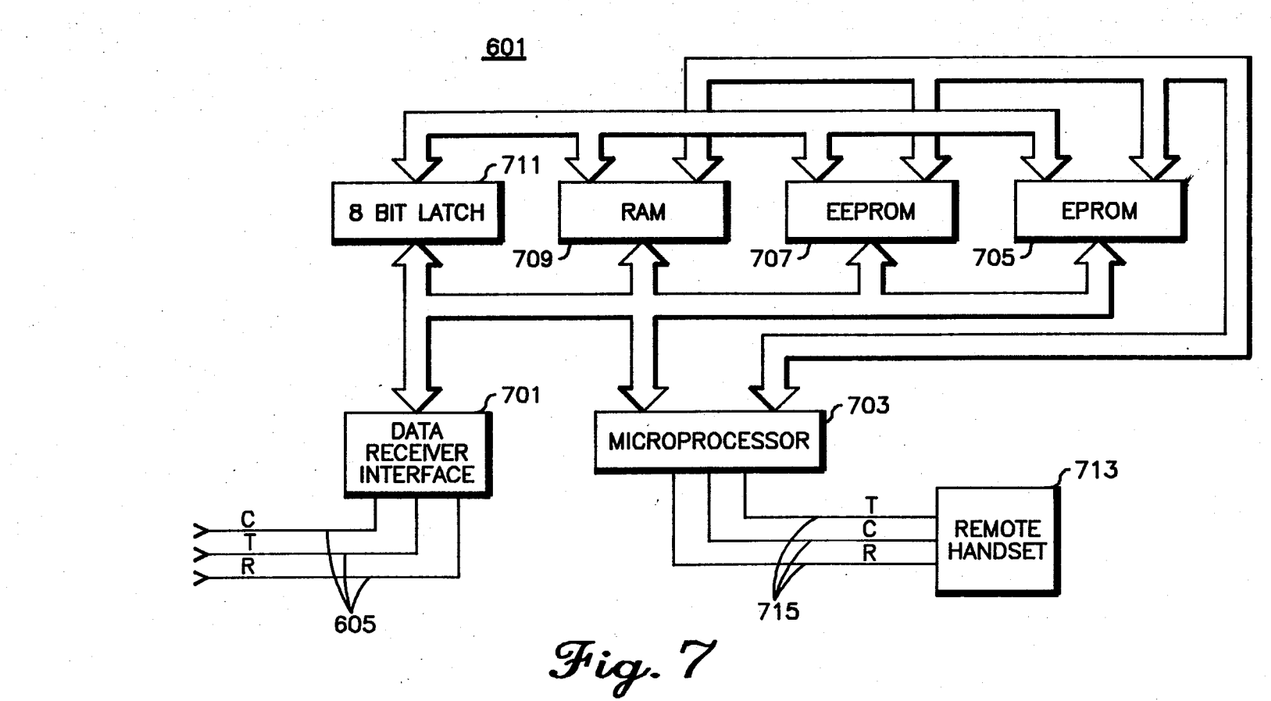
FIG. 7 is a block diagram of the remote converter and handset shown in FIG. 6.

The functions which comprise the converter and handset 601 and which interface with the serial data bus 605 are shown in FIG. 7. The serial data bus 605 (with inverted true and complement data lines) terminates in a data receiver interface 701 which, in the preferred embodiment, consists of a custom gate array and line buffer amplifiers. The primary function of the data receiver interface 701 is to convert the high speed serial data bus 605 into a conventional parallel bus accessible by microprocessor 703. Microprocessor 703 may be one of several commercially available microprocessors such as an MC146805 available from Motorola, Inc.

Memory which is available to microprocessor 703, consists of an 8K by 8 eraseable programmable read only memory (EPROM) 705, 2K by 8 electronically eraseable programmable read only memory (EEPROM) 707, 2K by 8 random access memory (RAM) 709, and conventional 8 bit latch 711. The EPROM 705 contains the operating program for microprocessor 703. The EEPROM 707 is used for the storage of telephone numbers to be remembered by the radiotelephone and, in the preferred embodiment, contains telephone numbers stored in locations 31 through 99 which will described in more detail later. The RAM 709 is used as a temporary storage location and scratch pad by microprocessor 703. The 8 bit latch 711 is used for control functions within the converter itself.

Microprocessor 703 connects with a remote handset 713 via a slow speed serial data bus 715 separate from that connecting with the portable radio telephone. The slow serial data bus 715 extends over a cable sometimes referred to as a "coil-cord" so that the remote hand set 713 may be extended to comfortably reach the user's ear. The data speed over the slow serial data bus, in the preferred embodiment, has a bit time equal to approximately one millisecond so that electrical noise commonly encountered in an automobile environment may be removed from the data bus.

The remote handset 713, which may be a F19CTA88-30AA manufactured by Motorola, Inc., has a remote keypad on which the user may dial a desired telephone number for either immediate use or for storage and later recall. The remote handset 713 may also have a display on which the dialled number or recalled number may be shown. Each of these user interface elements connect to the portable radiotelephone via the slow data interface bus 715, the microprocessor 703, the data receiver interface 701, and the high speed serial interface bus 605.

When the portable radiotelephone is placed in the converter, it is desirable for an automatic integration of all logic functions to occur. Initially, the portable radio telephone logic unit 101 must verify that it has been connected to the converter and handset 601. The portable unit keypad and display, the functions of which are not needed when the portable radiotelephone is in the converter, are temporarily disabled to reduce power consumption and extend component lifetime. The exchange of information between portable radiotelephone and the user interface elements is transferred to the remote handset 713. Finally when the portable radiotelephone is removed from the converter it is desirable to have the portable radiotelephone automatically detect the removal and resume normal portable operation with any customer features, such as volume level or telephone ringer activation, reset to those positions to which they were adjusted before the portable radiotelephone was placed in the converter.

Figure 8:
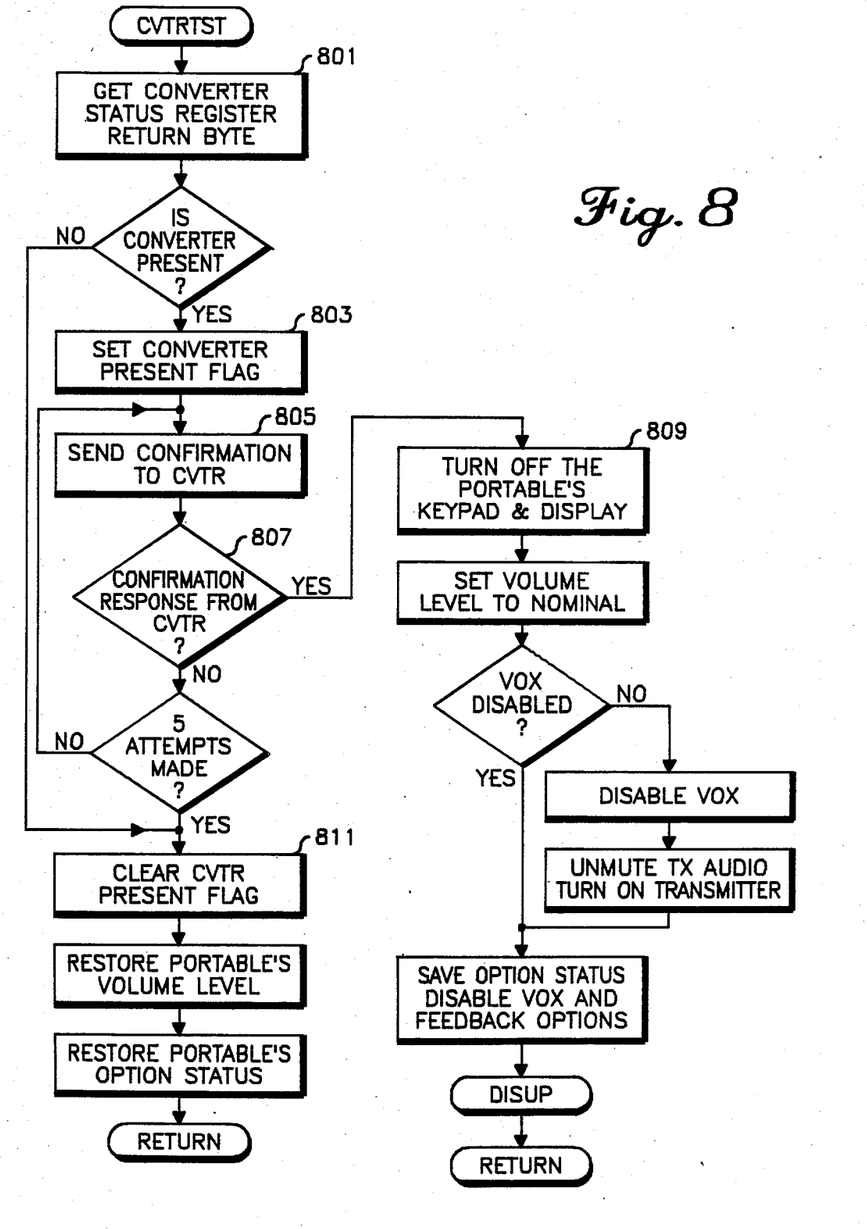
FIG. 8 is a flowchart of the process used in the present invention for detecting the presence of a remote converter and handset.

The first process which the logic unit 101 must undertake in integrating the logic functions is that of testing whether the portable radiotelephone has been placed in the converter. This process is shown in the algorithm of FIG. 8 and is repeated periodically by the logic unit 101. The first step in the process at block 801 consists of sending a message addressed to the converter via the true and complement data lines of the high speed serial data bus 605. If a response is received from the converter 601, a flag is set at 803 in the logic unit 101 memory indicating that the converter is present on the high speed serial data bus. A confirmation is then sent at 805 to the converter causing the converter microprocessor 703 to realize that the portable radiotelephone is present. If a confirmation response is received by the logic unit 101 from the converter at 807, the portable radiotelephone's keypad and display are turned off at 809. Other user setable functions are saved before they are disabled and the display update routine is entered before the logic unit 101 returns to its other duties. If a confirmation response is not received from the converter at 807, which may occur due to the microprocessor 703 attending other tasks, five additional attempts are made to send the confirmation to the converter. If no response is received from the converter 601, the converter present flag is cleared at 811 before returning to the main program.

Figures 9, 10A:
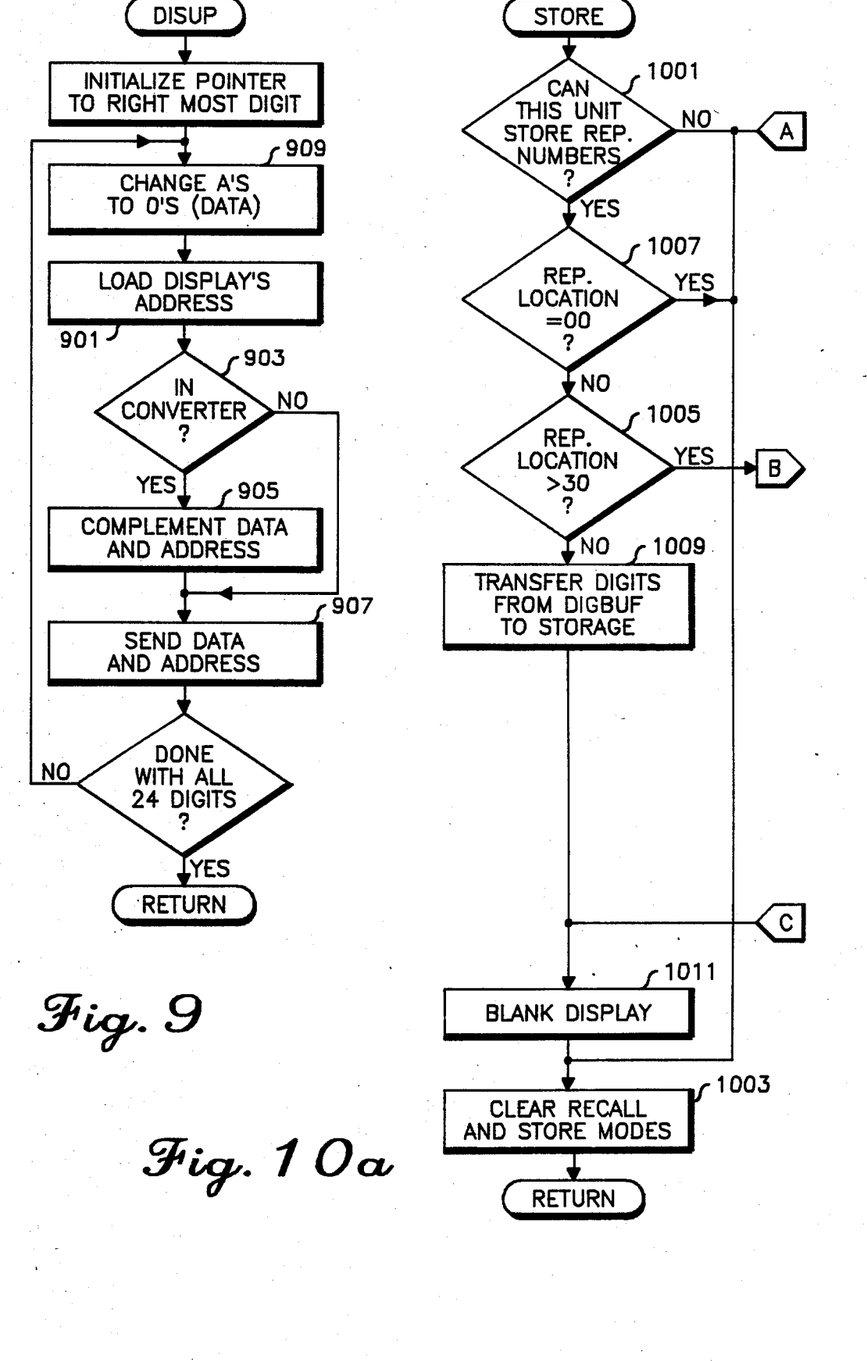
FIG. 9 is a flowchart of the process used in the present invention for communicating information to be displayed on either an internal display or an external display associated with the remote handset.
FIGS. 10a and 10b are flowcharts of the process used in the present invention for storing and recalling telephone numbers.

A process of updating the display is shown in figure 9. This process is a subroutine which is periodically called by the logic unit 101 in order to refresh the display without noticable flicker to the user. Since the internal display may be one of the data receivers on the high speed serial data bus, it can be assigned an unique address which is recalled at 901 in preparation for sending the information which is to be displayed on the display. If a remote display is present, it is assigned the logic complement of the internal display's address and is accessed via the converter. The converter present flag is tested at 903 to ascertain whether the portable radio telephone has been placed in the converter. If the portable radiotelephone is in the converter, the display address and data to be displayed is complemented at 905 so that the data and address may be read by the converter on the interchanged true data and complement data signal lines. The address and data is then applied to the high speed serial data bus at 907.

In the preferred embodiment each stored telephone number consists of 24 digits, some of which may be blanks. A separate storage area is dedicated to those digits which are to be displayed on the display. Each digit is read from memory one at a time starting at the right most digit and placed on the high speed data bus with the address of the display. (The data and address may be inverted or normal depending upon whether the portable radiotelephone is in the converter or not). In the preferred embodiment a numerical zero is stored as a hexadecimal A and a blank character is stored as a hexadecimal 0. A conversion of A's to 0's to blanks occurs at 909. When all 24 digits have been sent the subroutine returns to the main program.

The converter and remote handset of the preferred embodiment increase the number of telephone numbers which may be stored for later recall. This telephone number storage is commonly called repertory storage and may be divided such that telephone numbers may be stored in locations 01 to 30 in the portable radiotelephone and additional numbers from 31 to 99 may be stored in the converter. The converter utilizes the RAM 709 described in FIG. 7 to hold the storage location digits entered on the remote keypad of the remote handset 713 by the user. A user request to store a telephone number appearing in the display in locations 31 to 99 causes the converter to enter a "store" algorithm. The converter uses the last two keypad entries to calculate the repertory storage location number. The telephone number which was entered or otherwise appears in the display is removed from the display storage and stored in the appropriate location of EEPROM 707.

On a user request to recall a telephone number from a repertory storage location between 31 and 99, a "recall request" status bit is sent to the converter from the logic unit 101. The converter microprocessor 703 uses the last two key strokes stored in RAM 709 to determine the repertory location. The requested telephone number digits are recovered from the EEPROM 707 and conveyed to the logic unit 101 via the high speed data bus 605. The telephone number digits are stored in the display storage location and sent to the display as described previously.

Figure 10B:
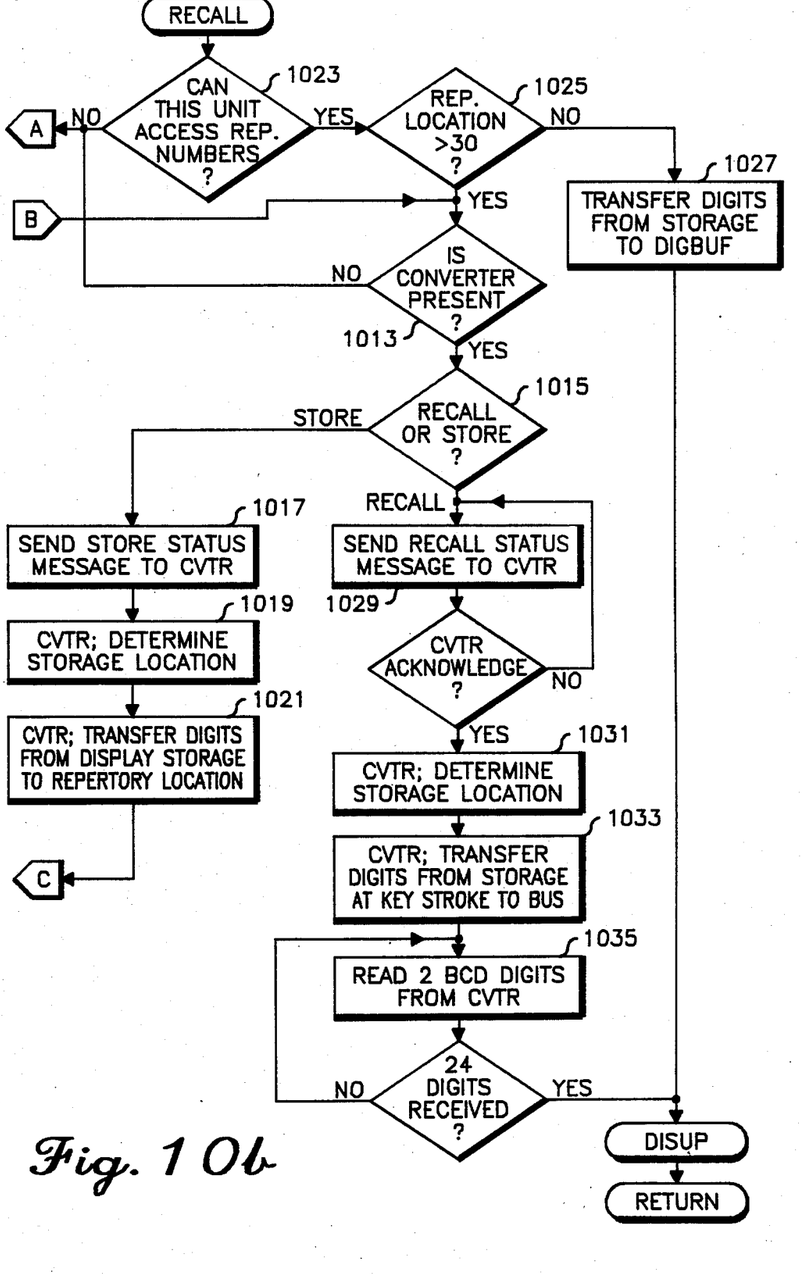

The store and recall processes used by the preferred embodiment are shown in the subroutine flowcharts of FIGS. 10a and 10b. The first step in the store subroutine is a decision block 1001 which makes the determination whether the particular portable radiotelephone has been equipped to store and recall numbers. If the portable radiotelephone is not so equipped, the algorithm returns to the main program after clearing the recall and store modes at 1003. If the portable radiotelephone is equipped to store and recall telephone numbers, a determination (decision block 1005) is made if the storage location chosen by the user is greater than 30. In the preferred embodiment storage locations 01 through 30 are available in the portable radiotelephone's logic unit memory while storage locations 31 through 99 are available in the EEPROM 707 of the converter. (Storage location 00 is a disallowed location and any attempt to store at this location is detected at 1007 and returned to the main program via clear recall and store modes at 1003). If the storage location chosen by the user is equal to or less than 30, the digits held in the display storage (DIGBUF) are transferred at 1009 to the storage location chosen by the user. The display is then blanked at 1011 before the algorithm returns to the main program. If the repertory location chosen by the user is greater than 30, the test at 1005 routes the program to a test of the presence of the converter at 1013 in FIG. 10b If the portable radiotelephone has not been placed in the converter, the algorithm returns to the main program. A positive test of the presence of the converter and a routing at 1015 results in a store status message sent to the converter at 1017. The converter subsequently reads the last two keystrokes stored in RAM 709 to calculate the repertory location at 1019 and causes the transfer of the digits stored in the display storage to the appropriate location in the EEPROM 707 at 1021. Following the storage of the telephone number, the display is blanked at 1011 and the recall and store modes are cleared at 1003 before returning to the main program.

To recall a stored number, a recall subroutine also shown in FIG. 10b is employed by the portable radiotelephone. As in the store subroutine the first step in the recall subroutine is a test of whether this particular portable radiotelephone is equipped with the capacity of storing and accessing repertory numbers (at 1023). If it cannot, the recall and store modes are cleared at 1003 and the program returns to the main program. If the unit can store and recall numbers, a test of the user selected repertory location is made at 1025. For repertory storage locations 01 through 30 the digits are transferred directly from the selected storage location to the display storage at 1027. The display update routine is then called before returning to the main program. If the selected repertory storage location is greater than 30 as decided by test 1025, the presence of the converter on the high speed serial data bus is tested at 1013 and a recall status message is sent to the converter at 1019 via the high speed serial data bus. In response, the converter reads (at 1031) the two bit key stroke storage to determine the desired storage location from which the telephone number is to be recalled. The converter then transfers the telephone number digits from the selected storage location to the high speed serial data bus from which the logic unit 101 (in FIG. 1) reads the digits two digits at a time at 1035 until all 24 digits are read. The subroutine then returns to the main program after calling the display update subroutine.

Figure 11:
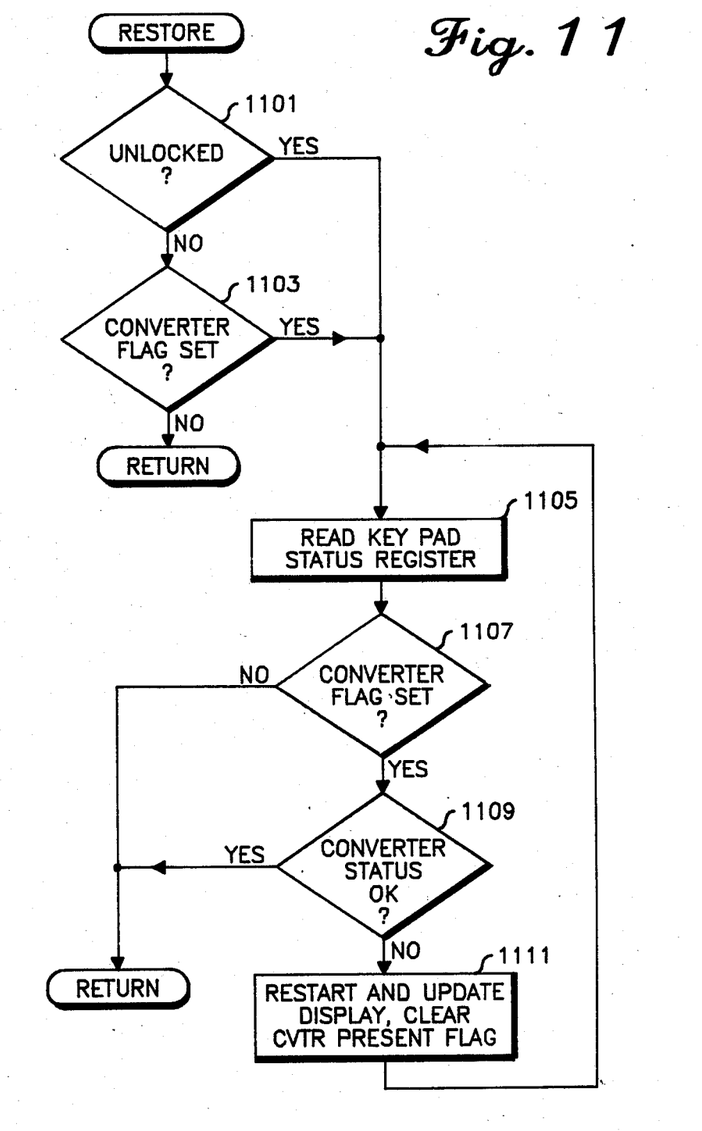
FIG. 11 is a flowchart of the process used in the present invention to detect the removal of the portable radiotelephone from the remote converter.

The portable radiotelephone periodically (approximately every 40 milliseconds in the preferred embodiment) calls a restore subroutine to check the status of certain perameters in the radio telephone. This subroutine is shown in the block diagram of FIG. 11. If the portable radio telephone is unlocked or has been placed in the converter, as determined by tests 1101 and 1103, the status of the keypad is read at 1105. If the converter present flag had previously been set, a decision block 1107 directs the subroutine to check a status register associated with the remote keypad. If the status register contains a proper 8 bit word which has predeterminedly been assigned to the converter remote keypad, the subroutine is directed at 1109 to the main program. If the status register contains an improper word such as the complement of the remote keypad word (which preferably is assigned to the integral portable radiotelephone keypad) the display is updated and the converter present flag is cleared at 1111 before returning to the main program. The data from the portable radiotelephone logic unit 101 at this time is no longer inverted so that the integral display and keypad may again receive the data.

In the foregoing description, a reliable means for detecting a converter and remote handset has been described. Once the converter has been detected, a simple means of communicating with the remote handset while disabling the integral keypad and display of the portable radiotelephone has been shown in the preferred embodiment. Furthermore, means for increasing the number of repertory storage locations, thereby giving the radiotelephone user additional features, has been discussed. While a particular embodiment of the invention has been described and shown, it should be understood that the invention is not limited thereto since many modifications may be made by those skilled in the art. It is therefore contemplated to cover by the present application any and all such modifications that fall within the true spirit and scope of the basic underlying principles disclosed and claimed herein.

I claim:

1. A portable radiotelephone having a logic unit, which communicates information with a first internal data device via a data bus and adapted to accept a detachable second external data device on the data bus comprising:
    means for detecting the presence of the second data device on the data bus;
    means, responsive to said detection of the presence of the second data device, for excluding the first data device and including the second data device in the logic unit information communication; and
    means for detecting a subsequent absence of the second data device from the data bus and for including the first data device while excluding the second data unit from the logic unit information communications.

2. A portable radiotelephone in accordance with claim 1, wherein the first and secono data devices each further comprise a keypad and an information display.

3. A portable radiotelephone in accordance with claim 1, wherein the portable radiotelephone further comprises means for storing information.

4. A portable radiotelephone in accordance with claim 3, wherein additional means for storing information is associated with the second data device.

5. A portable radiotelephone in accordance with claim 1, wherein the data bus is a serial bidirectional three conductor data bus.

6. A portable radiotelephone in accordance with claim 1, wherein the first data device has a first address for information to be communicated on the data bus and the second data device has a second address for information to be communicated on the data bus.

7. A portable radiotelephone in accordance with claim 6, wherein said means for excluding the first data device and including the second data device further comprises means for converting information addressed to said first address to information addressed to said second address.

8. A portable radiotelephone in accordance with claim 6, wherein said second address is a logic complement of said first address.

9. A portable radiotelephone in accordance with claim 6 wherein said second data device presence detector further comprises:
    means for sending a message addressed to the second data device;
    means for receiving a reply from the second data device; and
    means for setting a flag indicating that the second data device is present on the data bus.

10. A portable radiotelephone in accordance with claim 9 wherein said second data device subsequent absence detector further comprises:
    means for determining that said second data device presence flag is set;
    means for testing the status of the second data device if said flag is set: and
    means for resetting said second data device presence flag if said status test indicates the second data device is not on the data bus.

11. A portable radiotelephone having a logic unit, communicating with a first internal keypad at a first address via a data bus, and being adapted to accept a second external keypad at a second address, comprising:
- means for detecting the presence of the second keypad on the data bus;
- means, responsive to said detection of the presence of the second keypad, for directing communications away from the first address to the second address; and
- means for detecting a subsequent absence of the second keypad from the data bus and for redirecting communications to the first address of the first keypad.

12. A portable radiotelephone in accordance with claim 11, wherein the portable radiotelephone further comprises means for storing communications.

13. A portable radiotelephone in accordance with claim 11, wherein additional means for storing communications is associated with the second keypad.

14. A portable radiotelephone in accordance with claim 11, wherein the data bus is a serial bidirectional three conductor data bus.

15. A portable radiotelephone in accordance with claim 11, wherein the second address is a logic complement of the first address.

16. A portable radiotelephone in accordance with claim 11, wherein said means for detecting presence of the second keypad further comprises:
- means for sending a message addressed to the second keypad;
- means for receiving a message reply from the second keypad; and
- means for setting a flag indicating that the second keypad is present on the data bus.

17. A portable radiotelephone in accordance with claim 16, wherein said second keypad subsequent absence detector further comprises:
- means for determining that said second keypad presence flag is set:
- means for testing the status of the second keypad if the second keypad presence flag is set; and
- means for resetting the second keypad presence flag if said status test indicates said second keypad is not on the data bus.

18. A portable radiotelephone for use in a cellular radiotelephone system and adapted for handheld and mobile service comprising:
- a logic unit with a data bus;
- a keypad, integral to the portable radiotelephone, having a first data bus address;
- a mobile converter having a remote keypad with a second data bus address;
- means for detachably coupling said mobile converter and remote keypad to the data bus of the portable radiotelephone:
- means for detecting the presence of said remote keypad on the data bus;
- means, responsive to said detection of said remote keypad on the data bus, for changing the keypad data bus address used by said logic unit in communications with a keypad from said first data bus address to said second data bus address; and
- means for detecting a subsequent absence of said remote keypad from the data bus and for changing the data bus address used by said logic unit in communications with a keypad from said second data bus address to said first data bus address.

19. A portable radiotelephone in accordance with claim 18. wherein said mobile converter further comprises means for storing telephone numbers.

20. A portable radiotelephone in accordance with claim 19, wherein the logic unit further comprises means for placing telephone numbers into said mobile converter storage means and for recalling telephone numbers from said mobile converter storage means if said remote data receiver presence has been detected.

21. A portable radiotelephone in accordance with claim 18, wherein the data bus is a bidirectional three conductor serial data bus.

22. A portable radiotelephone in accordance with claim 18, wherein said second address is a logic complement of said first address.

23. A portable radiotelephone in accordance with claim 18 wherein said remote keypad presence detector further comprises:
- means for sending a message addressed to said remote keypad via the data bus;
- means for receiving a reply from said remote keypad; and
- means for setting a flag indicating that said remote keypad is present on the data bus.

24. A portable radiotelephone in accordance with claim 23 wherein said remote keypad subsequent absence detector further comprises:
- means for determining that said remote keypad presence flag is set;
- means for testing the status of the remote keypad if said flag is set; and
- means for resetting said remote keypad presence flag if said status test indicates said remote keypad is not on the data bus.

25. A method of selectively communicating information via a data bus between a logic unit of a portable radiotelephone and a first data device and adapting to a detachable second data device on the data bus comprising the steps of:
- detecting the presence of the second data device on the data bus;
- diverting information communications from between the first data device and the logic unit to between the second data device and the logic unit if the second data device presence has been detected;
- detecting a subsequent absence of the second data device from the data bus; and
- redirecting information communications to between the first data device and the logic unit if the second data device absence is detected.

26. A method in accordance with the method of claim 25, wherein the step of diverting information communications further comprises the step of converting information addressed to the first data device to information addressed to the second data device.

27. A method in accordance with the method of claim 25, wherein the step of detecting the presence of the second data device further comprises the steps of:
- sending a message addressed to the second data device;
- receiving a reply from the second data device; and
- setting a flag indicating that the second data device is present on the data bus.

28. A method in accordance with the method of claim 27, wherein the step of detecting a subsequent absence of the second data device further comprises the steps of:
- determining that said second data device presence flag is set;

testing the status of the second data device if said flag is set; and resetting the second data device presence flag if said status test indicates the second data device is not on the data bus.

29. A method of communicating telephone numbers via a serial data bus between a logic unit of a portable radiotelephone and at least two data devices having first and second addresses, comprising the steps of:
coupling a detachable mobile converter and the second address data device to the data bus of the portable radiotelephone;
detecting the presence of the second address data device on the data bus;
directing communications for the first address data device to the second address data device if the presence of the second address data device has been detected;
detecting a subsequent absence of the second address data device from the serial data bus and responsively redirecting communications for the first address data device to the first address data device.

30. A method in accordance with the method of claim 29, wherein the step of detecting the presence of the second address data device further comprises the steps of:
sending a message addressed to the second address data device;
receiving a reply from the second address data device: and
setting a flag indicating that the second address data device is present on the data bus.

31. A method in accordance with the method of claim 30, wherein the step of detecting a subsequent absence of the second address data device further comprises the steps of:
determining that the second address data device presence flag is set;
testing the status of the second address data device; and
resetting the second address data device presence flag if said status test indicates the second address data device is not on the data bus.

32. A portable radio transceiver having a logic unit which communicates information with a first data device via at least two of plurality of data signal lines and adapted to communicate information with a detachable second data device via at least two of the plurality of data signal lines, comprising:
means for detecting the presence of the second data device via at least one of the plurality of data signal lines;
means, responsive to said detection of the second data device, for inactivating the first data device and including the second data device in the logic unit information communication; and
means for detecting a subsequent absence of the second data device via at least one of the plurality of data signal lines and for reactivating said first data device.

33. A portable radio transceiver in accordance with claim 32 wherein said first and second data devices each further comprise means for storing communicated information.

34. A portable radio transceiver in accordance with claim 32 wherein said means for detecting the presence of the second data device further comprises:
means for sending a message to the second data device;
means for receiving a reply from the second data device; and
means for storing an indication that the second data device is present on said at least one of the plurality of data signal lines.

35. A portable radio transceiver in accordance with claim 34 wherein said means for detecting a subsequent absence of the second data device further comprises:
means for detecting said stored indication;
means for testing the status of the second data device via said at least one of the plurality of data signal lines; and
means for removing said stored indication if said status test indicates the second data device is not present on said at least one of the of the plurality of data signal lines.

36. A method of selectively communicating information via at least two of a plurality of data signal lines from a portable radio transceiver logic unit to a first data device and of adapting to a detachable second data device communicating information via at least two of the plurality of data signal lines, comprising the steps of:
detecting the presence of the second data device via at least one of the plurality of data signal lines;
diverting logic unit information communications from the first data device to the second data device if the second data device presence has been detected;
detecting a subsequent absence of the second data device via said at least one of the plurality of data signal lines; and
redirecting logic unit information communications to the first data device.

37. A method in accordance with the method of claim 36 wherein the step of detecting the presence of the second data device further comprises the steps of:
sending a message to the second data device via said at least one of the plurality of data signal lines;
receiving a reply from the second data device; and
storing an indication that the second data device is present on said at least one of the plurality of data signal lines.

38. A method in accordance with the method of claim 37 wherein the step of detecting a subsequent absence of the second data device further comprises the steps of:
detecting said indication;
testing the status of the second data device via said at least one of a plurality of data signal lines in response to said indication detection; and
deleting said stored indication if said status test indicates that the second data device is not present on said at least one of a plurality of data signal lines.

* * * * *